(12) United States Patent
Dai et al.

(10) Patent No.: US 11,769,971 B1
(45) Date of Patent: Sep. 26, 2023

(54) POWER PLUG

(71) Applicant: SHENZHEN HESUNG INNOVATION TECHNOLOGY CO., LTD, Shenzhen (CN)

(72) Inventors: Xianglu Dai, Shenzhen (CN); Jun Ye, Shenzhen (CN); Qimei Huang, Shenzhen (CN); Aimin He, Shenzhen (CN)

(73) Assignee: SHENZHEN HESUNG INNOVATION TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/116,843

(22) Filed: Mar. 3, 2023

(30) Foreign Application Priority Data

Dec. 20, 2022 (CN) .......................... 202211642707.3

(51) Int. Cl.
| | | |
|---|---|---|
| *H01R 24/28* | (2011.01) | |
| *H01R 13/66* | (2006.01) | |
| *H01H 37/54* | (2006.01) | |
| *H01R 103/00* | (2006.01) | |

(52) U.S. Cl.
CPC ............. *H01R 24/28* (2013.01); *H01H 37/54* (2013.01); *H01R 13/665* (2013.01); *H01R 2103/00* (2013.01)

(58) Field of Classification Search
CPC .. H01R 24/48; H01R 13/665; H01R 13/6666; H01R 13/6616; H01H 37/54
USPC ............. 439/620.08, 620.21, 620.22, 620.24
See application file for complete search history.

(56) References Cited

U.S. PATENT DOCUMENTS

| | | | | |
|---|---|---|---|---|
| 4,306,210 A | * | 12/1981 | Saur ...................... | H01H 37/32 337/2 |
| 4,356,385 A | * | 10/1982 | Stein .................. | G05D 23/1909 392/447 |
| 4,858,054 A | * | 8/1989 | Franklin .............. | H02H 1/0015 361/57 |
| 6,057,751 A | * | 5/2000 | Hung ..................... | H01H 61/02 337/377 |
| 6,525,640 B1 | * | 2/2003 | Busnello .................. | H01H 9/08 337/112 |
| 7,258,580 B1 | * | 8/2007 | Ho .......................... | H01R 24/58 439/668 |
| 11,125,401 B2 | * | 9/2021 | Chien ................... | F21S 10/002 |
| 2004/0145446 A1 | * | 7/2004 | Chou ................. | H01R 13/7137 337/37 |
| 2016/0075244 A1 | * | 3/2016 | Im .......................... | B60L 53/14 320/107 |
| 2017/0011877 A1 | * | 1/2017 | Ullermann ......... | H01H 37/5427 |
| 2017/0141519 A1 | * | 5/2017 | Lu ...................... | H01R 13/6691 |

* cited by examiner

*Primary Examiner* — Gary F Paumen

(57) ABSTRACT

A power plug includes a shell, an overheating protection module, a first wire, and a second wire. The overheating protection module includes a first pin, a second pin, a thermal circuit breaker, and a protective resistor. The thermal circuit breaker and the protective resistor are connected in parallel. A first end of the protective resistor is connected to one of the first pin or the second pin, and a second end of the protective resistor is connected to one of the first wire or the second wire. When temperature of the thermal circuit breaker is excessive, the thermal circuit breaker is disconnected, current continues to supply power to low-current electrical appliances through the protective resistor.

8 Claims, 3 Drawing Sheets

POWER PLUG

TECHNICAL FIELD

The present disclosure relates to a power plug.

BACKGROUND

With the development of society, electrical appliances are essential in daily life of people. Power plugs, serving as a device for connecting devices, such as the electrical appliances or others, to power supplies, also become particularly important. When high-power electrical appliances are powered on or work, due to excessive instantaneous power, poor contact between the power plugs and sockets, or other reasons, the power plugs may be overheated and burnt out, thereby causing safety problems.

In the prior art, the power plugs each is usually provided with a thermal circuit breaker, when temperature of the thermal circuit breaker is detected to be excessive, circuit is disconnected by the thermal circuit breaker, the whole circuit is in a disconnected state and cannot continue to supply power to low-current electrical appliances.

For example, Chinese patent application No. CN202020762940.5 discloses one embodiment, including a plug body, a power line, and a temperature limiter assembly, where the plug body is provided with a pin, the power line is connected to the plug body, and the temperature limiter assembly is disposed between the power line and the pin. The temperature limiter assembly includes a metal elastic piece, the metal elastic piece has two states that a first state is an initial state for electrically connecting the power line and the pin and a second state is an over-temperature protection state for disconnecting the power line and the pin when the metal elastic piece is deformed after heat, and the metal elastic piece is switched between the initial state and the over-temperature protection state. However, there is defect that when the metal elastic piece is in the over-temperature protection state, the metal elastic piece is elastically deformed, electrical connection between the pin and the power line is disconnected, the circuit may be directly disconnected, and cannot continue to supply power to the low-current electrical appliances.

For another example, Chinese patent application No. CN200610150096.5 discloses a security socket for connecting to current output ends, including a detection device, and the detection device is configured to detect fault of the current output ends when current flows through the security socket. However, there is defect that the security socket may directly disconnect current loop when overheating, so that the security socket cannot continue to supply power to the low-current electrical appliances.

Therefore, there is defect in the prior art that power plugs may be directly powered off when the temperature of the power plugs is detected to be excessive, and the power plugs cannot continue to supply power to other low-current electrical appliances (milliampere rated electrical appliances), so that subsequent security processing measures, such as alerting, cannot be taken.

Therefore, in view of above defects, the prior art still needs to be improved and developed.

SUMMARY

The present disclosure aims to provide a power plug to solve problems in the prior art that power plugs may be directly powered off when temperature is detected to be excessive, so that the power plugs cannot continue to supply power to other low-current electrical appliances.

In order to achieve above aims, the present disclosure provides a power plug, including a shell, an overheating protection module, a first wire, and a second wire. The overheating protection module includes a first pin, a second pin, a thermal circuit breaker, and a protective resistor. The thermal circuit breaker and the protective resistor are connected in parallel. A first end of the protective resistor is connected to one of the first pin or the second pin, and a second end of the protective resistor is connected to one of the first wire or the second wire. Two ends of each of the first wire and the second wire are respectively connected to the overheating protection module and an electrical device. The first pin and the second pin are at least partially disposed in the shell and protrude from the shell.

Furthermore, the overheating protection module further includes a heat conduction component, the heat conduction component is respectively connected to the first pin, the second pin, and the thermal circuit breaker.

Furthermore, the heat conduction component is an insulating heat conduction ceramic.

Furthermore, the power plug further includes a third pin and a third wire. Two ends of the third wire are respectively connected to the third pin and the electrical device, and the third pin is at least partially disposed in the shell and protrudes from the shell.

Furthermore, the thermal circuit breaker is a bimetal.

Furthermore, when temperature of the thermal circuit breaker reaches a preset temperature, the thermal circuit breaker is disconnected.

Furthermore, the preset temperature is not less than 80° C.

Furthermore, the electrical device is a warm air blower.

In summary, the present disclosure provides the power plug, including the shell, the overheating protection module, the first wire, and the second wire. The overheating protection module includes the first pin, the second pin, the thermal circuit breaker, and the protective resistor. The thermal circuit breaker and the protective resistor are connected in parallel. The first end of the protective resistor is connected to one of the first pin or the second pin, and the second end of the protective resistor is connected to one of the first wire or the second wire. The two ends of each of the first wire and the second wire are respectively connected to the overheating protection module and the electrical device. The first pin and the second pin are at least partially disposed in the shell and protrude from the shell. In the present disclosure, since the thermal circuit breaker and the protective resistor are connected in parallel, when temperatures of the first pin and the second pin are excessive, heat of the first pin and the second pin are conducted to the thermal circuit breaker, the thermal circuit breaker is automatically disconnected, and current may continue to supply power to the low-current appliances through the protective resistor, for example, to supply power to an alarm for prompting users with fault information.

BRIEF DESCRIPTION OF DRAWINGS

In order to more clearly illustrate technical solutions in embodiments of the present disclosure, accompanying drawings, which are required to be used in the embodiments or the prior art, are briefly described below, and it is obvious that the drawings in the following description are merely some embodiments of the present disclosure, and for a person of ordinary skill in the art, other drawings may also be obtained according to these drawings

DETAILED DESCRIPTION

In following description, for purposes of illustration and not by way of limitation, specific details such as specific system structures and technologies are presented in order to provide a thorough understanding of the embodiments of the present disclosure. However, it should be apparent to a person of ordinary skill in the art that the present disclosure may also be implemented in other embodiments without these specific details. In other instances, detailed descriptions of well-known systems, devices, circuits, and methods are omitted so as not to unnecessarily obscure the description of the present disclosure.

It should be understood that, when being used in this specification and the appended claims, terms "comprising" and "including" indicate presence of the described features, integers, steps, operations, elements, and/or components, but does not preclude the presence or addition of one or more other features, integers, steps, operations, elements, components, and/or a set thereof.

It should also be further understood that terms "and/or" as being used in the specification and the appended claims of the present disclosure indicate any combination of one or more of associated listed items and possible combinations thereof, and include these combinations.

Technical solutions in the embodiments of the present disclosure are clearly and completely described below with reference to the accompanying drawings of the embodiments of the present disclosure. All other embodiments obtained by a person of ordinary skill in the art based on the embodiments of the present disclosure without creative efforts shall fall within protection scopes of the present disclosure.

Numerous specific details are set forth in the following description to facilitate a thorough understanding of the present disclosure, but the present disclosure may also be implemented by using other different manners described herein, and a person of ordinary skill in the art may perform similar promotion without departing from connotation of the present disclosure, and therefore, the present disclosure is not limited by the specific embodiments disclosed below.

Figure 1:
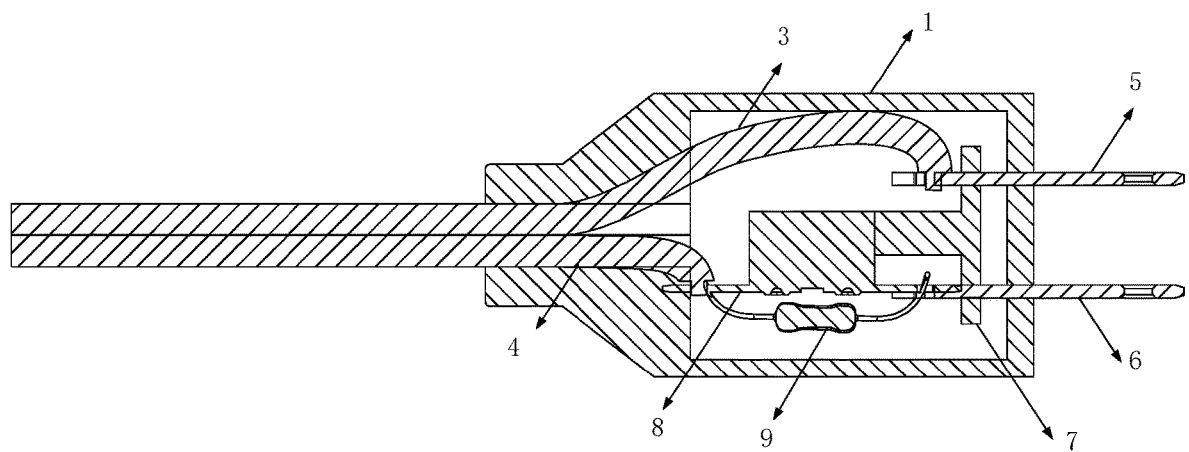
FIG. 1 is a structural schematic diagram of a power plug according to one embodiment of the present disclosure.
Figure 2:
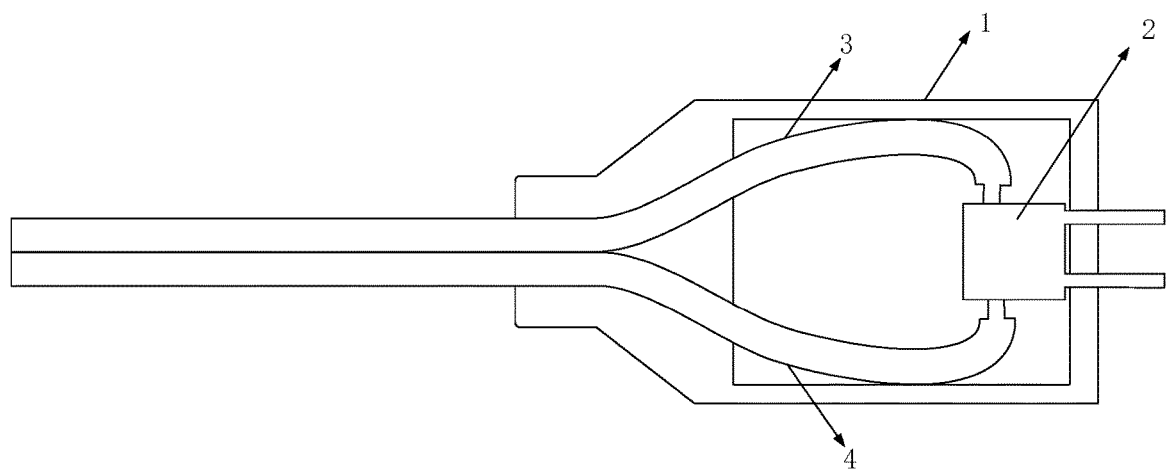
FIG. 2 is another structural schematic diagram of the power plug according to one embodiment of the present disclosure.
Figure 3:
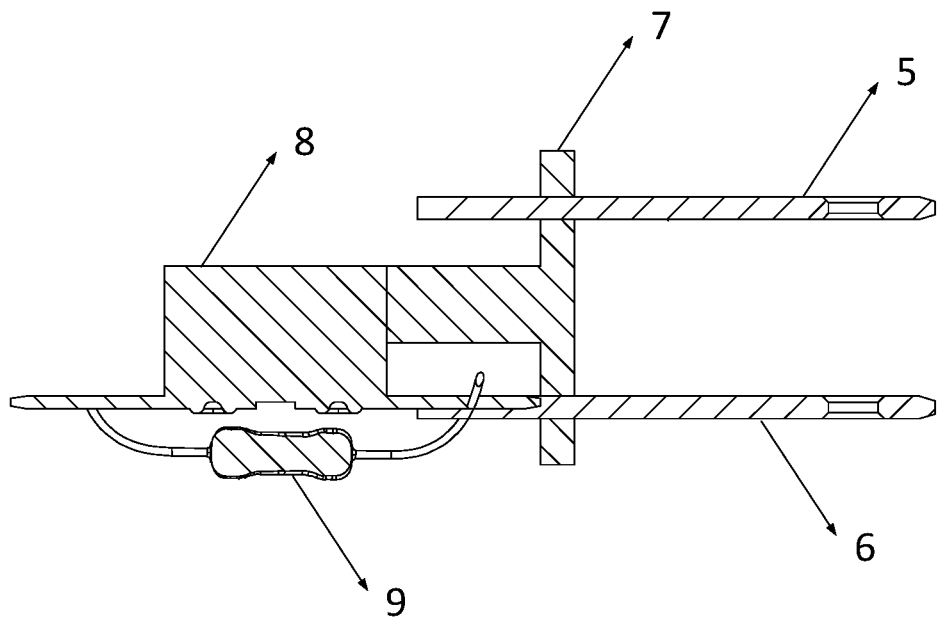
FIG. 3 is a structural schematic diagram of an overheating protection module according to one embodiment of the present disclosure.

As shown in FIGS. 1-3, FIGS. 1-3 are schematic diagrams of a power plug of the present disclosure, the power plug includes a shell 1, an overheating protection module 2, a first wire 3, and a second wire 4. The overheating protection module 2 includes a first pin 5, a second pin 6, a thermal circuit breaker 8, and a protective resistor 9. The thermal circuit breaker 8 and the protective resistor 9 are connected in parallel. A first end of the protective resistor 9 is connected to one of the first pin 5 or the second pin 6, and a second end of the protective resistor 9 is connected to one of the first wire 3 or the second wire 4. Two ends of each of the first wire 3 and the second wire 4 are respectively connected to the overheating protection module 2 and an electrical device. The first pin 5 and the second pin 6 are at least partially disposed in the shell 1 and protrude from the shell 3. The first wire 3 or the second wire 4 which is not connected to the second end of the protective resistor 9 only needs to be connected to the first pin 5 or the second pin 6 which is not connected to the first end of the protective resistor 9 for ensuring normal operation of circuit.

In one embodiment, the power plug includes a plurality of thermal circuit breakers and a plurality of protective resistors, each of the plurality of the thermal circuit breakers is connected to a corresponding one of the plurality of the protective resistors in parallel, a first end of each of the protective resistors is connected to one of the first pin or the second pin, a second end of each of the protective resistors is connected to one of the first wire and the second wire. The first wire or the second wire which is not connected to the second end of each of the plurality of the protective resistors only needs to be connected to the first pin or the second pin which is not connected to the first end of each of the plurality of the protective resistors for ensuring the normal operation of the circuit.

In one embodiment, the overheating protection module 2 further includes a heat conduction component 7, the heat conduction component 7 is respectively connected to the first pin 5, the second pin 6, and the thermal circuit breaker 8. The heat conduction component may improve efficiency of thermal conduction, thereby accelerating a speed of thermal reaction of the power plug, when the power plug is overheated, heat of the power plug may be quickly conducted to the thermal circuit breaker.

In one embodiment, the heat conduction component 7 is an insulating heat conduction ceramic.

In one embodiment, the power plug further includes a third pin and a third wire. Two ends of the third wire are respectively connected to the third pin and the electrical device, and the third pin is at least partially disposed in the shell and protrudes from the shell. The third pin, the first pin, and the second pin construct an integral pin of the power plug. Further, the first wire is a neutral wire, the second wire is a live wire, and the third wire is a ground wire; or, the first wire is a live wire, the second wire is a neutral wire, and the third wire is a ground wire.

In one embodiment, the first pin, the second pin, and the third pin of the power plug may be an American type pin, which is not limited herein.

In one embodiment, the thermal circuit breaker 8 is a bimetal.

In one embodiment, when temperature of the thermal circuit breaker 8 reaches a preset temperature, the thermal circuit breaker 8 is disconnected.

In one embodiment, the preset temperature is not less than 80° C.

For example, the thermal circuit breaker 8 is the bimetal, when the temperature of the thermal circuit breaker 8 reaches 80° C., the bimetal is automatically pop open. Specifically, types of the bimetal in different temperature conditions to pop open may be selected according to actual needs.

In one embodiment, as shown in FIG. 3, the overheating protection module 3 includes the first pin 5, the second pin 6, the heat conduction component 7, the thermal circuit breaker 8, and the protective resistor 9. When temperature of the first pin 5 or the second pin 6 is excessive, the heat conduction component 7 conducts heat to the thermal circuit breaker 8. When the temperature of the thermal circuit breaker 8 exceeds a preset temperature, the thermal circuit breaker 8 is disconnected. The preset temperature is determined according to the thermal circuit breaker 8. Low current may continue to supply power to the circuit through the protective resistor 9, that is, the protective resistor 9 in the overheating protection module 2 may continue to supply power to low-current appliances.

The heat conduction component is connected to bimetal, when contacts of the bimetal sense that the temperature exceeds the preset temperature, the bimetal may quickly pop open. That is, when the temperature sensed by the bimetal does not exceed the preset temperature, the bimetal is kept in a conductive state and to be connected to the protective resistor in parallel; when the bimetal senses that the temperature exceeds the preset temperature, a bimetallic strip on the bimetal is pop open, at this time, only the protective resistor is connected to a neutral wire or a live wire in series, and part of the current may still keep to pass through.

In one embodiment, the electrical device is a warm air blower.

In one embodiment, the electrical device includes a control chip, when the temperature of the thermal circuit breaker is excessive, the thermal circuit breaker is disconnected, due to existence of the protective resistor, the power line may continue to normally supply power to the low-current electrical appliances, only voltage may be reduced, that is, the power is continued to supply to the warm air blower, a part for switching power supply of the control chip normally works, and the voltage is converted into a low voltage (5V voltage), so that a micro controller unit (MCU) normally works.

In one embodiment, the control chip further includes a voltage detection circuit, the voltage detection circuit is configured to detect voltage values of the first wire and the second wire. The control chip determines whether the thermal circuit breaker is connected or disconnected according to the voltage values.

Figure 4:
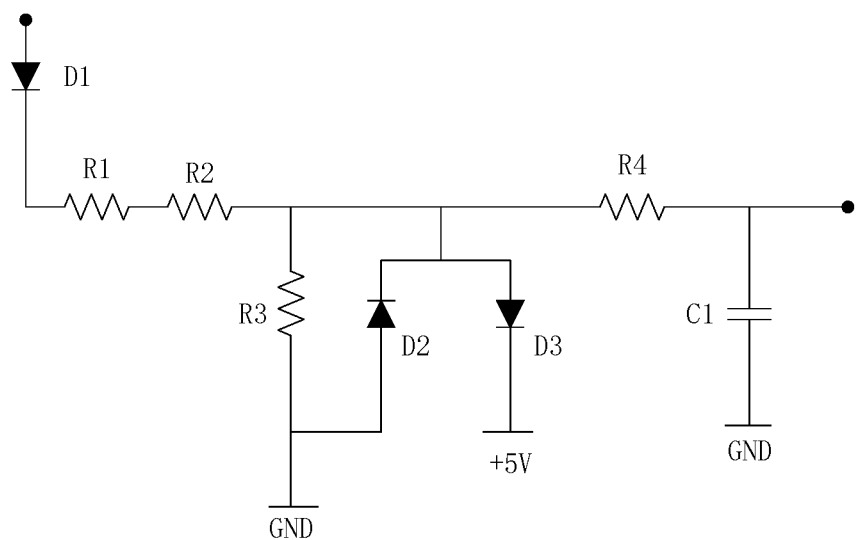
FIG. 4 is a circuit schematic diagram of a voltage detection circuit according to one embodiment of the present disclosure.

Specifically, as shown in FIG. 4, the voltage detection circuit includes a first diode D1, a second diode D2, a third diode D3, a first resistor R1, a second resistor R2, a third resistor R3, a fourth resistor R4, and a capacitor C1. A positive electrode of the first diode D1 is connected to a live wire of the control chip, a negative electrode of the first diode D1 is connected to a first end of the first resistor R1, a second end of the first resistor R1 is connected to a first end of the second resistor R2, a second end of the second resistor R2 is respectively connected to a first end of the third resistor R3, a negative electrode of the second diode D2, a positive electrode of the third diode D3, and a first end of the fourth resistor R4, a second end of the third resistor R3 and a positive electrode of the second diode D2 are grounded, a negative electrode of the diode D3 is connected to a conversion voltage (5V) of the control chip, a second end of the fourth resistor R3 and a first end of the capacitor C1 are connected to a detection port of the control chip, and a second end of the capacitor C1 is grounded.

In one embodiment, the control chip is configured to determine whether to supply power to a large-current device according to the on-off state of the thermal circuit breaker. For example, after the control chip determines that the thermal circuit breaker is in a disconnected state according to the voltage values, heavy-load electrical appliances are disconnected to be not supplied with power, and only low-load electrical appliances are powered, the low-load electrical appliances may be an alarm module or a communication module, so that fault information may be prompted to users in time after the thermal circuit breaker is disconnected.

In one embodiment, the electrical device further includes an alarm module. The control chip is further configured to control the alarm module to send an alarm signal when the thermal circuit breaker is in the disconnected state. The alarm module may be an audible and visual alarm.

Further, the electrical device includes a communication module. The control chip is further configured to send alarm information to the users when the thermal circuit breaker is in the disconnected state.

Further, the electrical device includes a display screen. The display screen is configured to prompt the fault information to the users when the thermal circuit breaker is in the disconnected state.

In one embodiment, the control chip includes a sampling resistor, the control chip detects changes of an analog-to-digital (AD) converted value through the sampling resistor. When the sampling resistor detects that a power supply voltage is less than a preset value, alarming is prompted and the heavy-load electrical appliances are disconnected, which plays a role in protection.

In one embodiment, when the sampling resistor detects that temperature of the power plug is less than a preset temperature, the control chip stops alarming. Specifically, when the temperature of the power plug is less than the preset temperature, the users is reminded to manually reset the power plug.

In one embodiment, the control chip is further configured to determine that the thermal circuit breaker is in the disconnected state when a sampling voltage value is less than a preset voltage value.

Based on above, the present disclosure provides the power plug, including the shell, the overheating protection module, the first wire, and the second wire. The overheating protection module includes the first pin, the second pin, the thermal circuit breaker, and the protective resistor. The thermal circuit breaker and the protective resistor are connected in parallel. The first end of the protective resistor is connected to one of the first pin or the second pin, and the second end of the protective resistor is connected to one of the first wire or the second wire. The two ends of each of the first wire and the second wire are respectively connected to the overheating protection module and the electrical device. The first pin and the second pin are at least partially disposed in the shell and protrude from the shell. In the present disclosure, since the thermal circuit breaker and the protective resistor are connected in parallel, when temperatures of the first pin and the second pin are excessive, heat of the first pin and the second pin are conducted to the thermal circuit breaker, the thermal circuit breaker is automatically disconnected, and current may continue to supply power to the low-current appliances through the protective resistor, for example, to supply power to an alarm for prompting users with fault information. It should be noted that, in the present disclosure, the low-current electrical appliances refer to milliampere rated electrical appliances.

The present disclosure further provides a control method for an electrical device, and the control method is mainly configured to control the control chip of the electrical device in above embodiments. The control method includes following steps:

detecting voltage values of a first wire and a second wire; and determining whether a thermal circuit breaker is connected or disconnected according to the voltage values.

Figure 5:
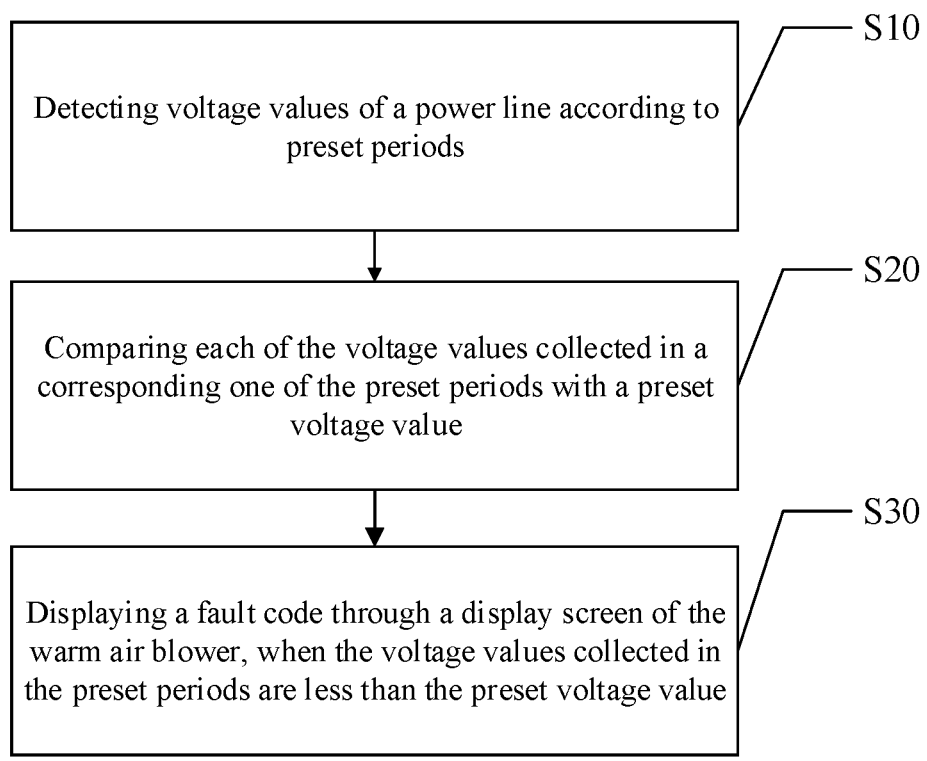
FIG. 5 is a process flow diagram of a control method according to one embodiment of the present disclosure.

Specifically, when the electrical device is a warm air blower, as shown in FIG. 5, the control method further includes following steps:

step S10, detecting voltage values of a power line according to preset periods;

step S20, comparing each of the voltage values collected in a corresponding one of the preset periods with a preset voltage value;

step S30, stopping heating a positive temperature coefficient (PTC) heating tube and displaying a fault code through a display screen of the warm air blower, when the voltage values collected in the preset periods is less than the preset voltage value.

Based on above, in the control method, whether the warm air blower breaks down or not is determined through detecting the voltage values of the power line. When the warm air blower breaks down, fault information is prompted to users, a power supply mode is timely adjusted, and heavy-load electrical appliances are not supplied with power any more.

It can be clearly understood by a person of ordinary skill in the art that, for convenience and brevity of description, the above-mentioned functions can be allocated to different functional unit or modules for completion according to needs in practical application, that is, an inner structure of the device is divided into different functional units or modules to complete all or part of the functions described above. The functional units and modules in the embodiments may be integrated into one processing unit, or each unit may exist alone physically, or two or more units may be integrated into one unit, and the integrated unit may be implemented in the form of hardware, or may be implemented in the form of a software functional unit. In addition, the specific names of the functional units and the modules are merely for facilitating mutual differentiation, and are not intended to limit the protection scope of the present disclosure. For a specific working process of units and modules in the foregoing system, reference may be made to a corresponding process in the foregoing embodiments of the method, and details are not described herein again.

In the above embodiments, the descriptions of the various embodiments are emphasized respectively, and some embodiments, which are not described in detail or specified in some embodiments, may refer to related descriptions of other embodiments.

A person of ordinary skill in the art may be aware that units and algorithm steps of examples described in connection with the embodiments disclosed herein can be implemented by electronic hardware, or a combination of computer software and electronic hardware. Whether the functions are performed by hardware or software depends on specific applications and design constraint conditions of the technical solutions. A person skilled in the art may use different methods to implement the described functions for each specific application, but it should not be considered that the implementation goes beyond the scope of the present disclosure.

In the embodiments provided by the present disclosure, it should be understood that the disclosed apparatus/terminal device and method may be implemented in other modes. For example, the apparatus/terminal device embodiments described above are merely illustrative, for example, division of the above-mentioned modules or units is merely a logical function division, and the actual implementation may be performed by another division mode, for example, multiple units or components may be combined or may be integrated into another system, or some features may be ignored, or not performed.

When the integrated module/unit is implemented in the form of a software functional unit and sold or used as an independent product, the integrated module/unit may be stored in a computer-readable storage medium. Based on such understanding, the present disclosure implements all or some of the processes in the method described above, or may be completed by a computer program instructing related hardware, and the computer program may be stored in a computer-readable storage medium, and when being executed by the processor, the computer program may implement the steps of the foregoing embodiments of the method. The computer program includes a computer program code, and the computer program code may be in the form of a source code, an object code form, an executable file, or some intermediate form, etc. The computer-readable medium may include any entity or device capable of carrying the computer program code, a recording medium, a USB flash disk, a mobile hard disk, a magnetic disk, an optical disk, a computer memory, a read-only memory (ROM), a random access memory (RAM), an electrical carrier signal, a telecommunication signal, a software distribution medium, etc. It should be noted that, the content contained in the computer-readable storage medium may be increased or decreased as appropriate according to the requirements of the law and patent practice in the jurisdiction of the judicial administration area.

The above embodiments are merely used to illustrate the technical solutions of the present disclosure, rather than limiting the technical solutions of the present disclosure. Although the present disclosure has been described in detail with reference to the foregoing embodiments, it should be understood by a person of ordinary skill in the art that it can still modify the technical solutions recited in the foregoing embodiments, or replace some of the technical features therein. However, these modifications or substitutions are not intended to depart from the spirit and scope of the technical solutions of the embodiments of the present disclosure, and should be included within the scope of protection of the present disclosure.

What is claimed is:

1. A power plug, comprising:
a shell;
an overheating protection module;
a first wire; and
a second wire;
wherein the overheating protection module comprises a first pin, a second pin, a thermal circuit breaker, and a protective resistor; the thermal circuit breaker and the protective resistor are connected in parallel;
a first end of the protective resistor is connected to one of the first pin or the second pin, and a second end of the protective resistor is connected to one of the first wire or the second wire; and
two ends of each of the first wire and the second wire are respectively connected to the overheating protection module and an electrical device; and the first pin and the second pin are at least partially disposed in the shell and protrude from the shell.

2. The power plug according to claim 1, wherein the overheating protection module further comprises a heat conduction component, the heat conduction component is respectively connected to the first pin, the second pin, and the thermal circuit breaker.

3. The power plug according to claim 2, wherein the heat conduction component is an insulating heat conduction ceramic.

4. The power plug according to claim 1, wherein the power plug further comprises a third pin and a third wire; two ends of the third wire are respectively connected to the third pin and the electrical device, and the third pin is at least partially disposed in the shell and protrudes from the shell.

5. The power plug according to claim 1, wherein the thermal circuit breaker is a bimetal.

6. The power plug according to claim 1, wherein when temperature of the thermal circuit breaker reaches a preset temperature, the thermal circuit breaker is disconnected.

7. The power plug according to claim 6, wherein the preset temperature is not less than 80° C.

8. The power plug according to claim 1, wherein the electrical device is a warm air blower.

* * * * *